United States Patent [19]

Kanemitsu

[11] Patent Number: 5,130,589

[45] Date of Patent: Jul. 14, 1992

[54] IMBALANCE CORRECTING APPARATUS FOR A ROTOR

[75] Inventor: Yoichi Kanemitsu, Kanagawa, Japan

[73] Assignee: Ebara Corporation, Tokyo, Japan

[21] Appl. No.: 667,895

[22] Filed: Mar. 12, 1991

[30] Foreign Application Priority Data

Mar. 16, 1990 [JP] Japan .................................. 2-66054

[51] Int. Cl.$^5$ .................. H02K 7/09; G05B 13/02; F16C 39/06
[52] U.S. Cl. ................................ 310/90.5; 318/640; 324/207.12
[58] Field of Search ............... 310/90.5; 318/128, 138, 318/610, 629, 632, 640, 646, 641, 561; 73/458, 468; 74/573 R; 324/207.12, 225

[56] References Cited

U.S. PATENT DOCUMENTS

| | | | |
|---|---|---|---|
| 4,733,149 | 3/1988 | Culberson | 318/610 |
| 4,841,184 | 6/1989 | Chen et al. | 310/90.5 |
| 4,841,212 | 6/1989 | Matsushita | 310/90.5 |
| 4,910,449 | 3/1990 | Hiyama et al. | 310/90.5 |
| 4,950,966 | 8/1990 | Moulds, III | 318/640 |
| 5,013,987 | 5/1991 | Wakui | 324/207.12 |

FOREIGN PATENT DOCUMENTS

| | | |
|---|---|---|
| 0291931 | 11/1988 | European Pat. Off. . |
| 3913053 | 11/1989 | Fed. Rep. of Germany . |
| 59-89821 | 5/1984 | Japan . |
| 1129582 | 5/1984 | United Kingdom . |

OTHER PUBLICATIONS

"A Design of Robust Servo Controllers for an Unbalance Vibration in Magnetic Bearing Systems"-Magnetic Bearing, 1988, pp. 319-326.

"Balancing Measurement Systems Using Magnetic Bearings"—Magnetic Bearing, 1988, pp. 327-334.

Primary Examiner—R. Skudy
Assistant Examiner—D. S. Rebsch
Attorney, Agent, or Firm—Armstrong, Nikaido, Marmelstein, Kubovcik & Murray

[57] ABSTRACT

An apparatus for correcting imbalance of a rotor suspended by a magnetic bearing system including a displacement sensor for detecting a displacement of the rotor. An imbalance correcting circuit applies a trial imbalance correcting signal to the magnetic bearing system. A command computer applies an amount of correction to the imbalance correcting circuit and calculates an influence factor of the imbalance correcting signal on the basis of outputs from the displacement sensor before and after the imbalance correcting signal is applied to the magnetic bearing system, so as to cause the imbalance correcting circuit to apply a predetermined imbalance correcting signal produced from the influence factor to the magnetic bearing system, thereby minimizing the output of the displacement sensor to correct mass-imbalance of the rotor.

3 Claims, 6 Drawing Sheets

IMBALANCE CORRECTING APPARATUS FOR A ROTOR

BACKGROUND OF THE INVENTION

1. Field of the Invention

The present invention relates to an imbalance correcting apparatus for a rotary member such as a rotary axle supported by a magnetic bearing and used in a turbo-machine and a numerical control machine.

2. Description of the Prior Art

Imbalance correction of a rotary axle of a turbo-machine and a numerical control machine is conventionally carried out by means of an exclusive balancer before the rotary axle is fitted in such a machine. Otherwise, after fitting a rotary axle in a machine, a trial weight is fixed to the rotary axle. The axle is then rotated at a predetermined speed and vibration emanating from a bearing supporting the rotating axle is measured. This procedure is repeated several times and a correcting weight for correcting the imbalance is calculated by an exclusive calculator. Then the rotary axle is stopped and the correcting weight is fixed to the axle.

In such correcting procedures as described above, however, correcting weights must be fixed to and removed from a rotary axle a number of times, and the rotary axle must be repeatedly rotated and stopped. As a result, a great deal of time is required to correct any imbalance of a rotary axle.

SUMMARY OF THE INVENTION

It is an object of the invention to provide an efficient imbalance correcting apparatus for balancing a rotary member.

It is another object of the invention to provide an imbalance correcting apparatus which does not require any special equipment in order to correct an imbalance of a rotary member.

It is a still another object of the invention to provide an imbalance correcting apparatus which can improve the reliability of a rotary member supported by a magnetic bearing without increasing manufacturing costs.

To achieve the above-described object, the present invention provide an apparatus for correcting an imbalance of a rotary member suspended from a magnetic bearing system which includes a displacement sensor which detects a displacement of a rotary member, comprising:
- a first means for applying a correcting signal to the magnetic bearing system; and
- a second means responsive to the output of the displacement sensor for calculating an amount of required correction on the basis of the outputs of the displacement sensor before and after said correction signal is applied to the magnetic bearing system through the first means, the correcting amount being fed to the first means to cause the correcting signal corresponding to the correcting amount to be output from the first means, thereby minimizing the output of the displacement sensor to correct any mass-imbalance of the rotary member.

The first means may be an imbalance correcting circuit for applying a imbalance correcting signal to the magnetic bearing system.

The second means may be a command computer for applying an amount of correction to the imbalance correcting circuit, and may be operative to calculate an influence factor of the imbalance correcting signal on the basis of outputs from the displacement sensor before and after the imbalance correcting signal is applied to the magnetic bearing system, so as to cause the imbalance correcting circuit to apply a predetermined imbalance correcting signal produced from the influence factor to the magnetic bearing system, thereby minimizing the output of the displacement sensor to correct mass-imbalance of the rotor.

As described above, the command computer calculates an influence factor on the basis of outputs from the displacement sensor before and after an imbalance correcting signal is applied to the magnetic bearing system, and causes the imbalance correcting circuit to apply to the magnetic bearing system an imbalance correcting signal determined on the basis on the influence factor calculated, thereby recovering mass-balance of the rotary member substantially in real time. This can be done without starting and stopping a machine driving the rotary member, and serves to eliminate such work as fixing a trial weight to and removing the weight from the rotary member.

These and other objects and advantages of the invention will become clearer from the following description of embodiments with reference to the accompanying drawings.

DESCRIPTION OF THE PREFERRED EMBODIMENT

Some preferred embodiments of an imbalance correcting apparatus according to the present invention will hereinafter be described with reference to the drawings.

Figure 1:
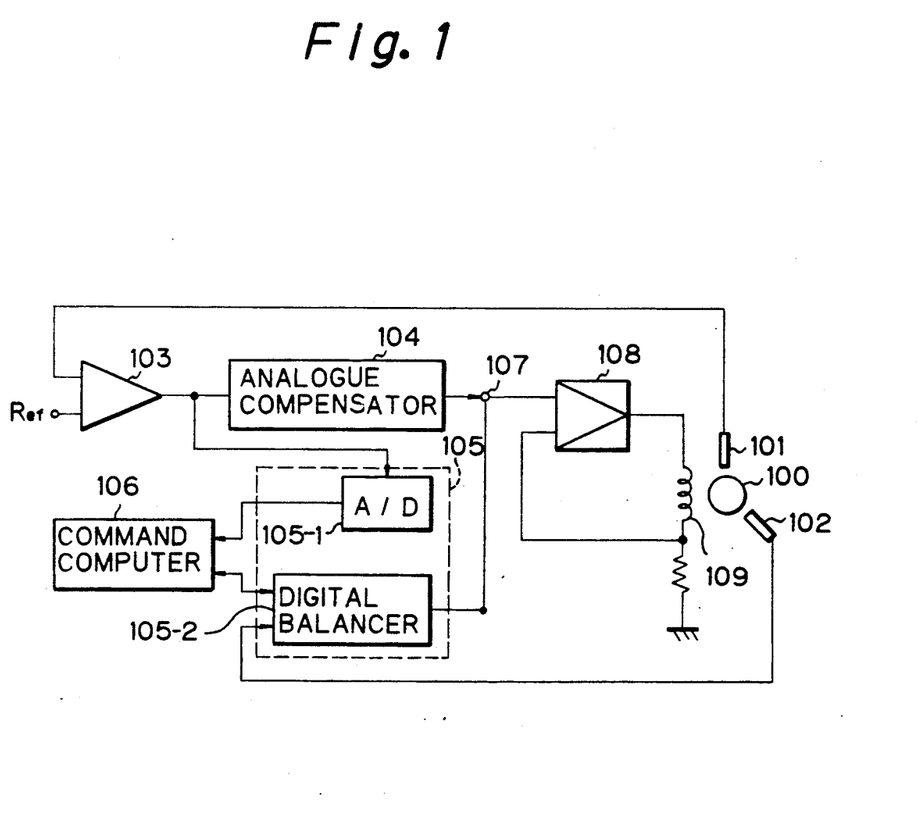
FIG. 1 is a block diagram showing the construction of an embodiment of an imbalance correcting apparatus according to the present invention.

FIG. 1 is a block diagram showing the construction of an embodiment of an imbalance correcting apparatus according to the present invention. In the figure, a rotary axle 100 is supported by a magnetic bearing system including a coil 109 of an electromagnet. In order to detect a displacement of the rotary axle 100, a displacement sensor 101 is provided. Another sensor 102 is also provided for detecting a reference sinusoidal wave.

The imbalance correcting apparatus according to the present invention comprises an amplifier 103 to which the output of the displacement sensor 101 is connected, an analogue compensating circuit 104 connected to the output of the amplifier 103, an imbalance correction instructing circuit 105 including a digital signal processor (DSP), a command computer 106 connected to the imbalance correction instructing circuit 106 connected to the imbalance correction instructing circuit 105 and an adder 107 for adding the outputs of the analogue compensating circuit 104 and the imbalance correction instructing circuit 105. The output of the adder 107 is connected to a driver 108. The imbalance correction instructing circuit 105 includes an A/D converter 105-1 and a digital balancing circuit 105-2. The amplifier 103 may be a differential amplifier which outputs a difference between the output of the displacement sensor 101 and a reference value Ref usually equal to zero. The analogue compensating circuit 104 serves to control an operation to suspend the rotary axle 100.

In the imbalance correcting apparatus, the imbalance correction instructing circuit 105 applies a trial correcting signal through the adder 107 and the driver 108 to the electromagnet coil 109. The displacement sensor 101 detects a displacement of the rotary axle 100 caused by the trial correcting signal. The detected displacement is input through the amplifier 103 and the A/D converter 105-1 in the imbalance correction instructing circuit 105 to the command computer 106. The command computer 106 calculates an influence coefficient of the trial correcting signal from the outputs of the displacement sensor 101 before and after applying the trial correcting signal. On the basis of the calculated result, a new imbalance correction signal is obtained and applied through the digital balancing circuit 105-2 of the imbalance correction instructing circuit 105, the adder 107 and the driver 108 to the electromagnetic oil 109. This serves to minimize the output of the displacement sensor 101 and correct a mass-imbalance of the rotary axle 100.

Figure 2A:
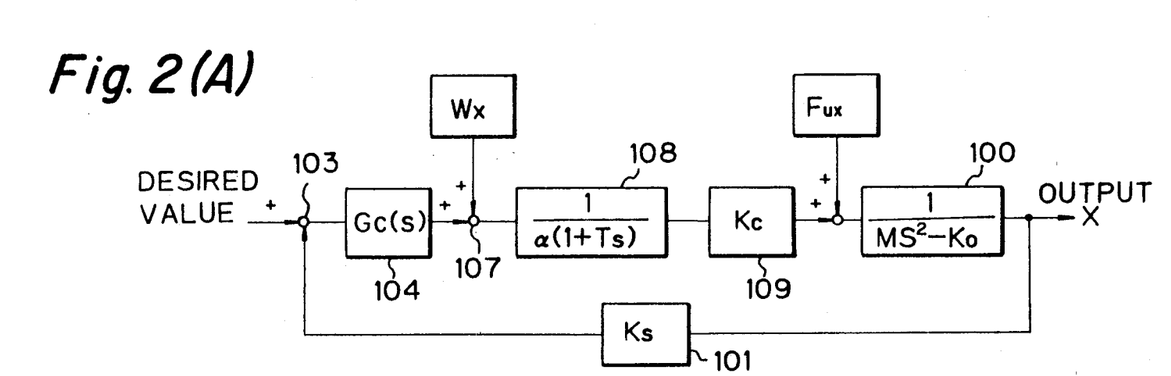
FIGS. 2A and 2B are block diagrams of a rotary axle-magnetic bearing system subject to disturbance due to an imbalance of the rotary axle.
Figure 2B:
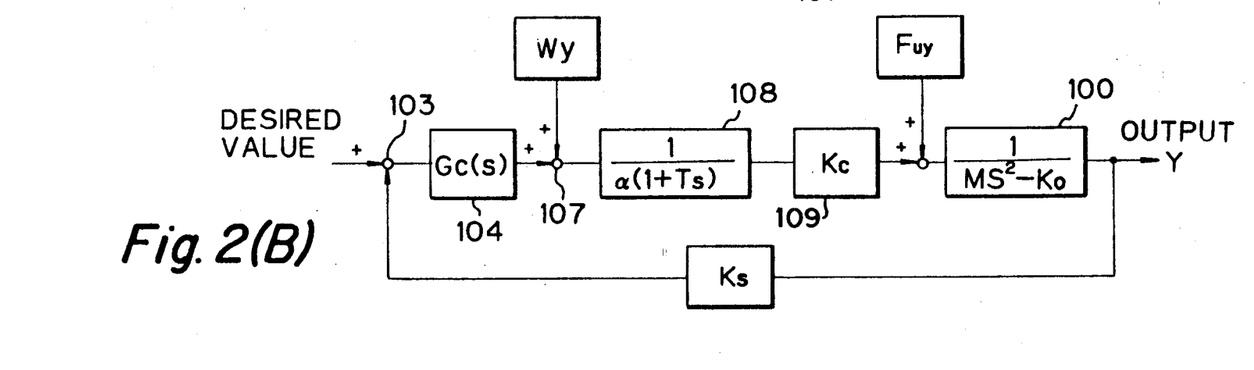

FIGS. 2A and 2B show block diagrams of a rotary axle-magnetic bearing system where disturbances $F_{ux}$ and $R_{uy}$ due to residual imbalance of the rotary axle 100 exist. In the figure, the same reference numerals as used in FIG. 1 designate similar or corresponding parts.

The magnetic bearing system is controlled so that the displacement of the rotary axle 100 becomes zero. It is difficult to make the loop gain of the magnetic bearing infinite, and therefore, the loop gain has a finite value. Due to this fact, similar to the case of being supported by a sliding bearing, the rotary axle 100 is caused to vibrate by a residual imbalance. It is to be noted that the present invention eliminates vibration of the rotary axle due to residual imbalance by applying control signals $W_x$ and $W_y$ in synchronization with the rotation of the rotary axle, that is, rotation synchronizing control signals, to a magnetic bearing system so as to cancel the disturbances $F_{ux}$ and $F_{uy}$ caused by the residual imbalance.

A transfer function $G_{mr}(s)$ from the rotation synchronizing control signals $W_x$ and $W_y$ to the outputs X and Y of the magnetic bearing system can be obtained in advance. When that transfer function is known, rotation synchronizing control signals for correcting imbalance of the rotary axle can easily be obtained from the output of the bearing system in the case of the rotation synchronizing control signals $W_x$ and $W_y$ being equal to zero, that is, in the case where only disturbances due to the imbalance exist. If, however, the transfer function $G_{mr}(s)$ at a rotational frequency (the frequency of a reference sinusoidal wave) is measured during rotation of the rotary axle with a servo analyzer, an error is inevitable because of the existence of vibration of the rotary axle due to imbalance. Consequently, according to the present invention, the rotation synchronizing control signals are added to the output of the analogue compensating circuit 104 by the adder 107, and then a change in the output of the displacement sensor 101 is detected by the imbalance correcting apparatus. On the basis of the detected change, the transfer function $G_{mr}(s)$ at the rotational frequency is estimated. Thus, rotation synchronizing control signals $W_x$ and $W_y$ for correcting imbalance of the rotary axle to reduce residual imbalance thereof can be obtained using a estimated transfer function and added to the output of the analogue compensating circuit 104 by the adder 107, thereby establishing the rotary axle.

Procedures for balancing the rotary axle in real time are performed in the following steps mainly under the control of the command computer 106:

STEP 1

From the outputs (or axial vibrations) $x_1(t)$, $x_2(t)$, $y_1(t)$ and $Y_2(t)$ of four displacement sensors $SX_1$, $SX_2$, $SY_1$ and $SY_2$ (FIG. 3) provided for two magnetic bearings which support the rotary axle 100, amplitudes $X_1\theta$, $X_2\theta$, $Y_1\theta$ and $Y_2\theta$ and phases $\Theta_{x1}\theta$, $\Theta_{x2}\theta$, $\Theta_{y1}\theta$ and $\Theta_{y2}\theta$ of the displacement sensor output s with respect to a reference pulse (a rotation synchronizing signal) are obtained. The phase of the axial vibration with respect to a rotational pulse can be relatively easily obtained as a digital amount by using the reference sinusoidal wave and a program counter.

STEP 2

Figure 3:
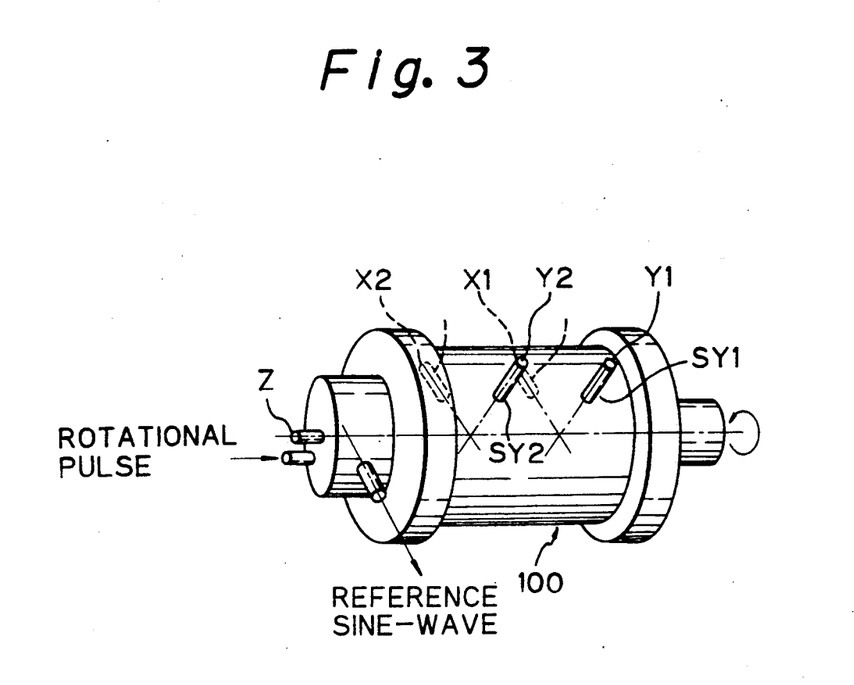
FIG. 3 shows an example of a positional relationship between the rotary axle suspended by magnetic bearings and displacement sensors placed around the rotary axle.

The amplitude $W_1\theta$ and phase $\Theta_1$ of a first trial correcting signal to be applied to the magnetic bearings are calculated as follows:

$$W_1\theta = (X_1\theta + Y_1\theta)/2$$

$$\Theta_1\theta = (\Theta_{x1}\theta + \Theta_{y1}\theta + \pi/2)/2$$

Then, first rotation synchronizing control signals $W_{x1}$ and $W_{y1}$ given in the following equations are applied to the magnetic bearings, and the outputs $x_{11}(t)$, $x_{21}(t)$, $y_{11}(t)$ and $y_{21}(t)$ of the displacement sensors $SX_1$, $SC_2$, $SY_1$ and $SY_2$ are measured:

$$W_{x1} = -W_1\theta \cos(j\omega T + \Theta_1)$$

$$W_{y1} = -W_1\theta \cos(j\omega T + \Theta_1 - \pi/2)$$

where T is a sampling period of the imbalance correction instructing circuit 105 and j is equal to 0, 1, ... ($j\omega T \geq 2\pi$).

STEP 3

The amplitude $W_2\theta$ and phase $\Theta_2$ of a second trial correcting signal to be applied to the magnetic bearings are calcualted as follows:

$$W_2\theta = (X_2\theta + Y_2\theta)/2$$

$$\Theta_2\theta = (\Theta_{x2}\theta + \Theta_{y2}\theta + \pi/2)/2$$

Then, second rotation synchronizing control signals $W_{x2}$ and $W_{y2}$ given in the following equations are applied to the magnetic bearings, and the outputs $x_{12}(t)$, $x_{22}(t)$, $y_{12}(t)$ and $y_{22}(t)$ of the displacement sensors $SX_1$, $SX_2$, $SY_1$ and $SY_2$ are measured:

$$W_{x2} = -W_2\theta \cos(j\omega T + \Theta_2)$$

$$W_{y2} = -W_2\theta \cos(j\omega T + \Theta_2 - \pi/2)$$

STEP 4

The outputs of the displacement sensors, that is, displacement signals, measured in the steps 2 and 3 are used for calculating the amplitudes $X_{ij}$ and $Y_{ij}$ and phases $\Theta_{xij}$ and $\Theta_{yij}$ thereof, where i ($=1, 2$) and j ($=1, 2$) indicate the position of the sensor and the position of the magnetic bearing, respectively.

STEP 5

An influence coefficient matrix A, that is, a transfer function between the rotation synchronizing control signal and the output of the displacement sensor, is obtained. An element $a_{ij}$ (i=1, 2, 3 and 4, j=1 and 2) is expressed as follows:

$$a_{11} = \{X_{11}exp(i\Theta_{x11}) - X_1\theta exp(i\Theta_{x1}\theta)\}/W_1\theta exp(i\Theta_1\theta)$$

$$a_{12} = \{X_{11}exp(i\Theta_{x11}) - X_1\theta exp(i\Theta_{x1}\theta)\}/W_1\theta exp(i\Theta_2\theta)$$

$$a_{21} = \{X_{21}exp(i\Theta_{x11}) - X_2\theta exp(i\Theta_{x1}\theta)\}/W_1\theta exp(i\Theta_1\theta)$$

$$a_{22} = \{X_{21}exp(i\Theta_{x21}) - X_2\theta exp(i\Theta_{x2}\theta)\}/W_2\theta exp(i\Theta_2\theta)$$

$$a_{31} = \{Y_{11}exp(i\Theta_{y11}) - Y_1\theta exp(i\Theta_{y1}\theta)\}/W_1\theta exp(i\Theta_1\theta)$$

$$a_{32} = \{Y_{21}exp(i\Theta_{y11}) - Y_2\theta exp(i\Theta_{y1}\theta)\}/W_1\theta exp(i\Theta_2\theta)$$

$$a_{41} = \{Y_{11}exp(i\Theta_{y11}) - Y_1\theta exp(i\Theta_{y1}\Theta)\}/W_2\theta exp(i\Theta_1\theta)$$

$$a_{42} = \{Y_{21}exp(i\Theta_{y21}) - Y_2\theta exp(i\Theta_{y2}\theta)\}/W_2\theta exp(i\Theta_2\theta)$$

STEP 6

Using the data obtained above, correcting signals are calculated such that a residual vibration vector E may be minimized. Assuming that X and W designate a displacement vector measured in the step 1 and a correcting vector, respectively, then $$W = -\begin{bmatrix} W_1 exp(i\Theta_1) \\ W_2 exp(i\Theta_2) \end{bmatrix}$$

$$E = X - AW$$

Introducing a weight coefficient matrix C, the following equation can be obtained from a condition which minimizes $E \times CE$:

$$W = -(A \times CA)^{-1} A \times CA$$

thereby obtaining a correcting signal, where $A^\times$ and $E^\times$ are conjugate transposition matrices of A and E.

STEP 7

Figure 4:
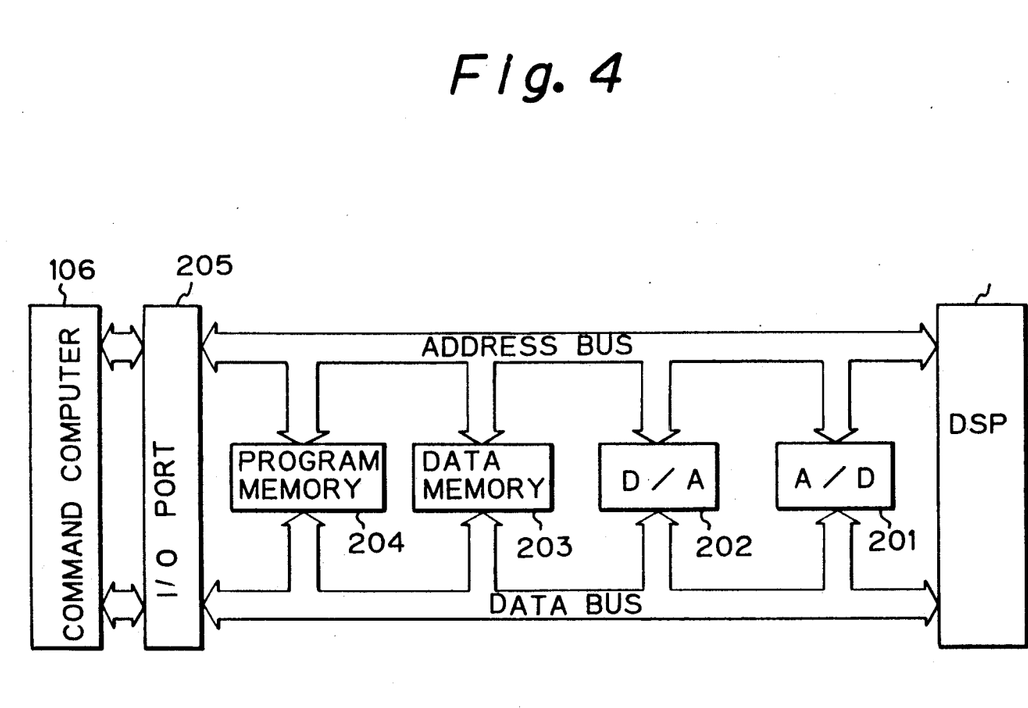
FIG. 4 is a block diagram showing the construction of an imbalance correction instructing circuit shown in FIG. 1.

The outputs (or axial vibrations) $x_1(t)$, $x_2(t)$, $y_1(t)$ and $y_2(t)$ of the four displacement sensors $SX_1$, $SX_2$, $WY_1$ and $SY_2$ provided in the two magnetic bearings are respectively added to the following values to reduce vibration of the rotary axle;

$-W_1\cos(j\omega T + \Theta_1)$
$-W_1\cos(j\omega T + \Theta_1 - \pi/2)$
$-W_2\cos(j\omega T + \Theta_2)$
$-W_2\cos(j\omega T + \Theta_2 - \pi/2)$ FIG. 4 is a block diagram showing the construction of the imbalance correction instructing circuit 105. As shown in this figure, the imbalance correction instruction circuit 105 is connected through a parallel I/O port 205 to the command computer 106, and comprises a digital signal processor (DSP) 200 for calculating the above-described operations of the STEP 7, a program memory 204 for storing programs for the operations, and A/D converter 201 for converting axle vibration data (the output of the displacement sensor 101 and amplified by the amplifier 103) to a digital amount, a data memory 203 for storing the digitized axle vibration data and a D/A converter 202 for converting an operational result to an analogue amount to be output.

Figure 5A:
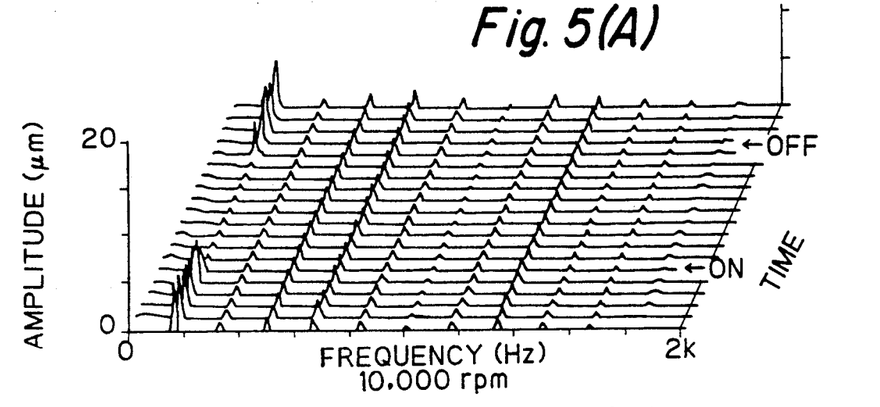
FIGS. 5A, 5B and 5C show results of correction performed by the imbalance correcting apparatus according to the present invention.
Figure 5B:
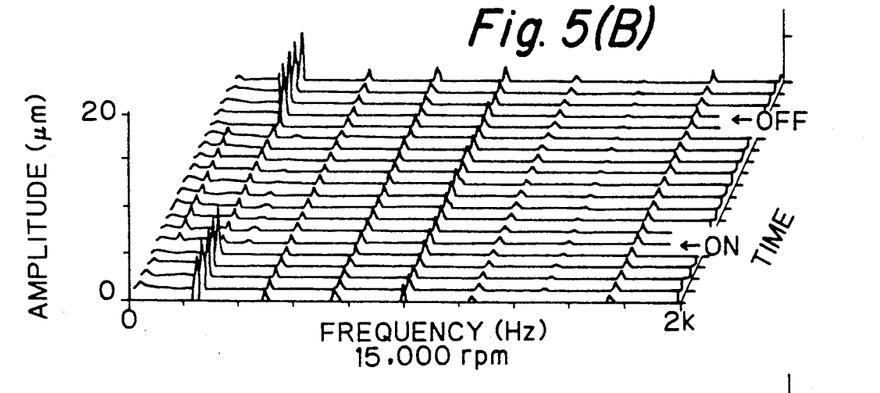
Figure 5C:
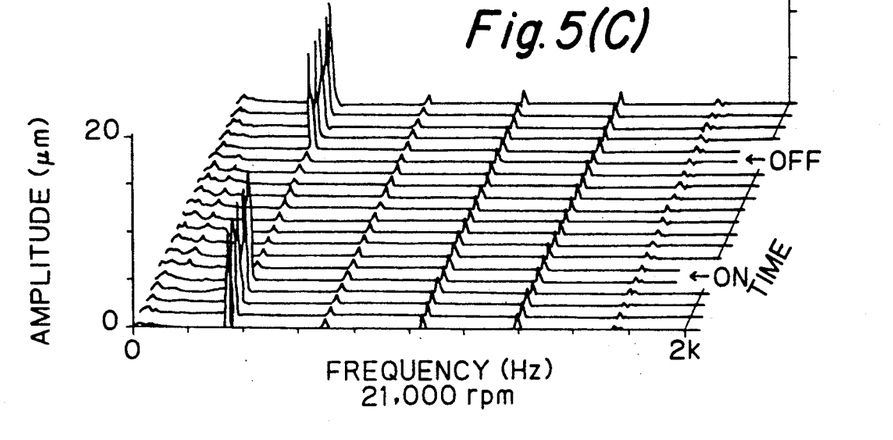

FIGS. 5A, 5B and 5C exemplarily show results of correction to imbalance of the rotary axle performed by such an imbalance correcting apparatus as constructed above. In these figures, three orthogonal axes indicate the amplitude of vibration, the frequency of vibration and time, respectively, in a three-dimensional manner. FIG. 5A shows a case of the rotational speed of 10,000 r.p.m.; FIG. 5B a case of the rotational speed of 15,000 r.p.m.; and FIG. 5C a case of the rotational speed of 21,000 r.p.m. In these figures, ON and OFF indicate time points when the imbalance correction instructing circuit 105 is turned on and off. As can be understood from FIGS. 5A to 5C, the amplitude of vibration of the rotary axle decreases when the imbalance correction instructing circuit 105 is turned on, and increases when the circuit 105 is turned off. This means that the imbalance correcting apparatus according to the present invention enables a balance of the rotary axle to be established in real time.

Figure 6:
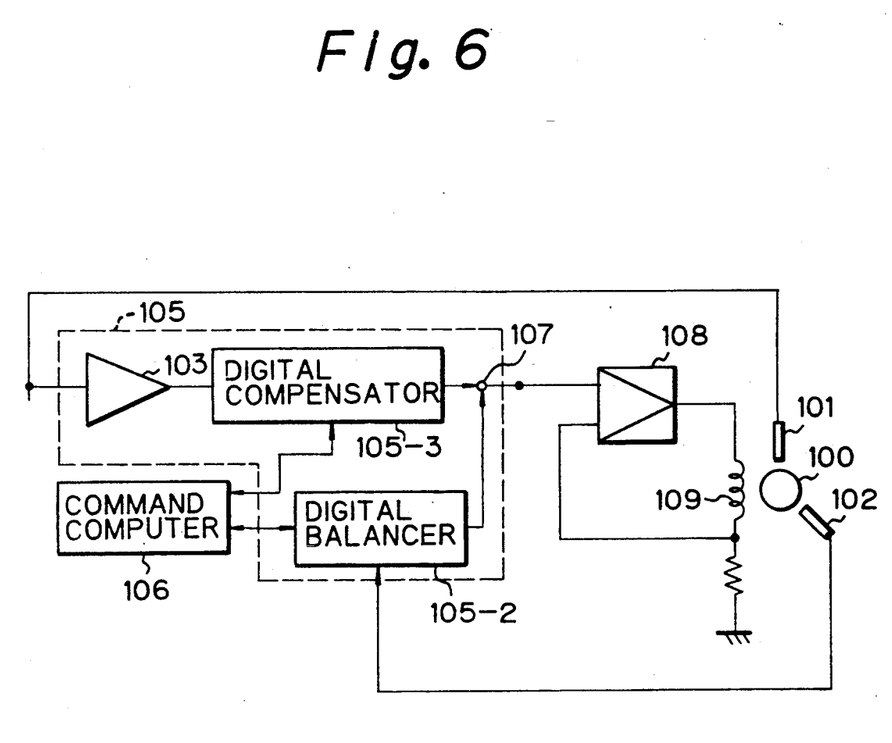
FIG. 6 is a block diagram showing the construction of another embodiment of an imbalance correcting apparatus according to the present invention.

FIG. 6 is a block diagram of another embodiment of an imbalance correcting apparatus according to the present invention. As seen from this figure, the analogue compensating circuit 104 and the A/D converter 105-1 shown in FIG. 1 are omitted and the imbalance correction instructing circuit 105 includes a digital compensating circuit 105-3 placed between the amplifier 103 and the adder 107 and mutually communicating with the command computer 106. This embodiment can deal with signals digitally, and the suspension control of the rotary axle 100, and the balance recovery thereof can be effected by a DSP board incorporating the digital balancing circuit 105-2 and the digital compensating circuit 105-3.

The invention has been described in detail with particular reference to certain embodiments thereof, but it will be understood that variations and modifications can be effected within the spirit and scope of the invention.

What is claimed is:

1. An apparatus for correcting imbalance of a rotary member suspended from a magnetic bearing system including a displacement sensor which detects a displacement of the rotary member, comprising:
   a first means for applying a trial correcting signal to said magnetic bearing system; and
   a second means responsive to the output of said displacement sensor for calculating an amount of required correction on the basis of the outputs of said displacement sensor before and after said trail correction signal is applied to said magnetic bearing system through said first means, said correcting amount being fed to said trial first means to cause said correcting signal corresponding to said correcting amount to be output from said first means, thereby minimizing the output of said displacement sensor to correct mass-imbalance of said rotary member.

2. An imbalance correcting apparatus for a rotor suspended by a magnetic bearing system including a displacement sensor for detecting a displacement of the rotor, comprising:

an imbalance correcting circuit for applying a trail imbalance correcting signal to the magnetic bearing system; and a command computer for applying an amount of correction to said imbalance correcting circuit, said command computer being operative to calculate an influence factor of the trial imbalance correcting signal on the basis of outputs from said displacement sensor before and after the trial imbalance correcting signal is applied to said magnetic bearing system, so as to cause said imbalance correcting circuit to apply a predetermined imbalance correcting signal produced from the influence factor to said magnetic bearing system, thereby minimizing the output of said displacement sensor to correct mass-imbalance of said rotor.

3. An apparatus as set forth in claim 2 further comprising a differential amplifier which receives the output of said displacement sensor and a reference value, and an adder for adding the outputs of said imbalance correcting circuit and said differential amplifier, said differential amplifier being operative to supply a difference between the output of the displacement sensor and the reference value to said imbalance correcting circuit and said adder.

* * * * *